United States Patent Office 3,225,474
Patented Dec. 28, 1965

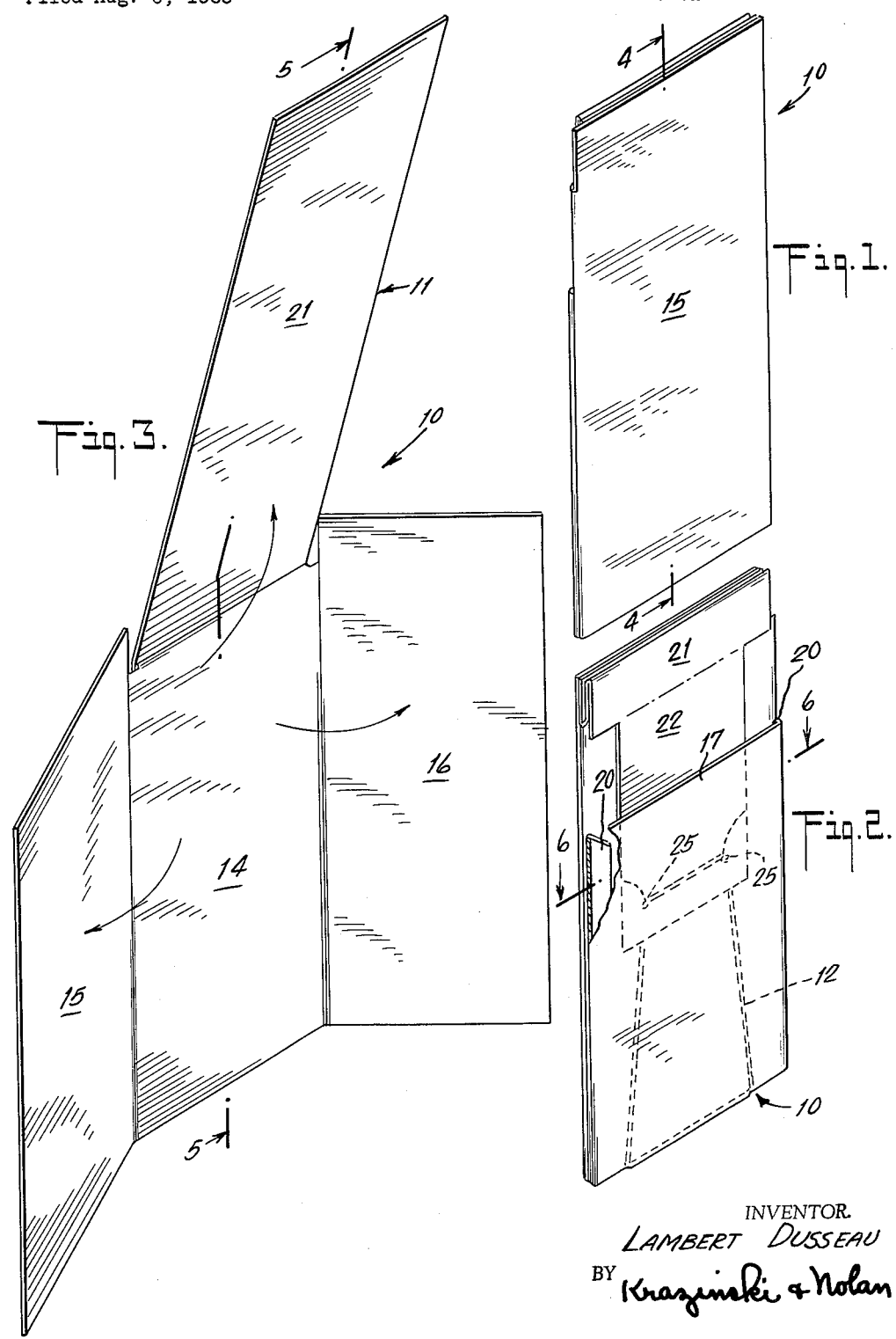

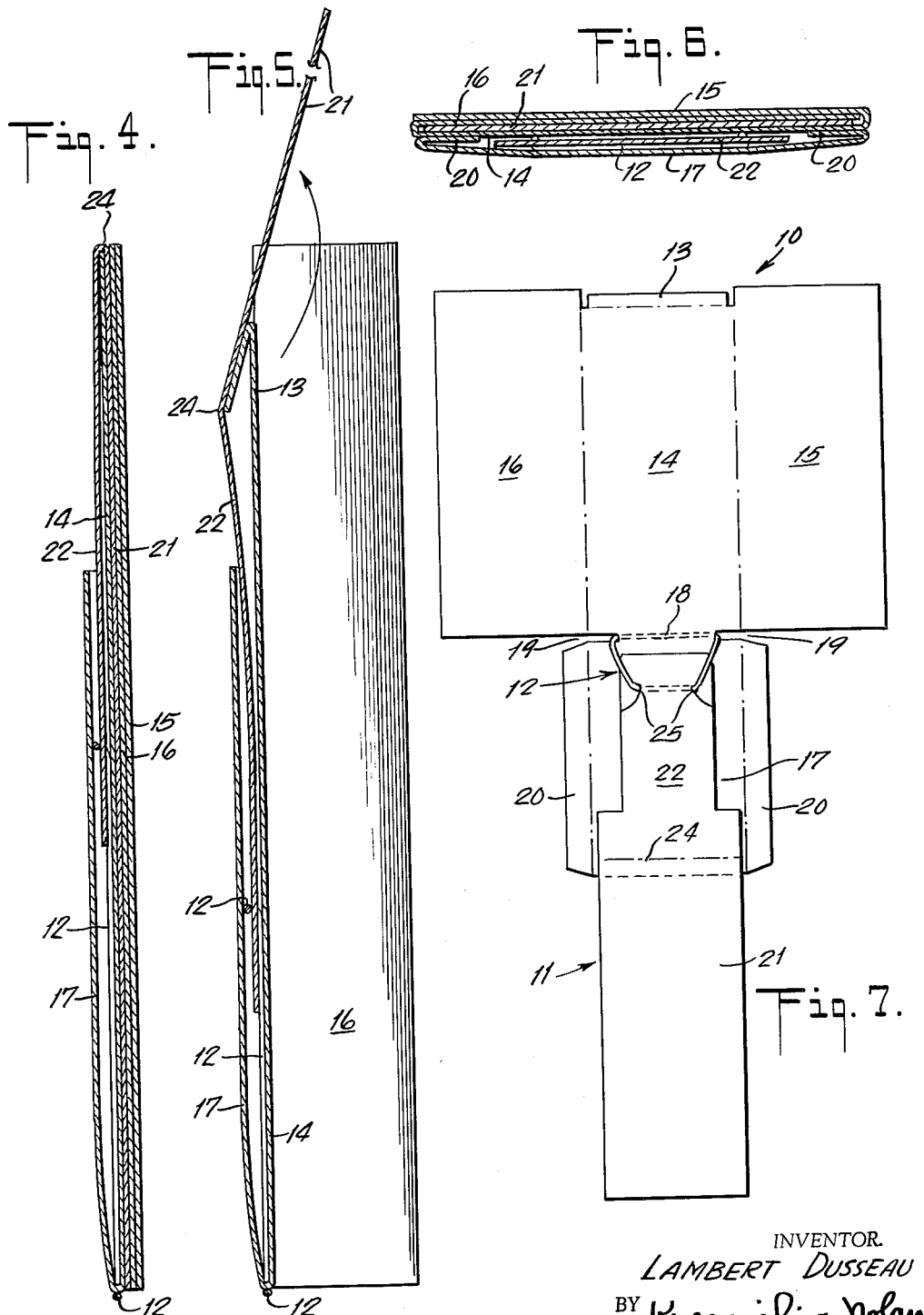

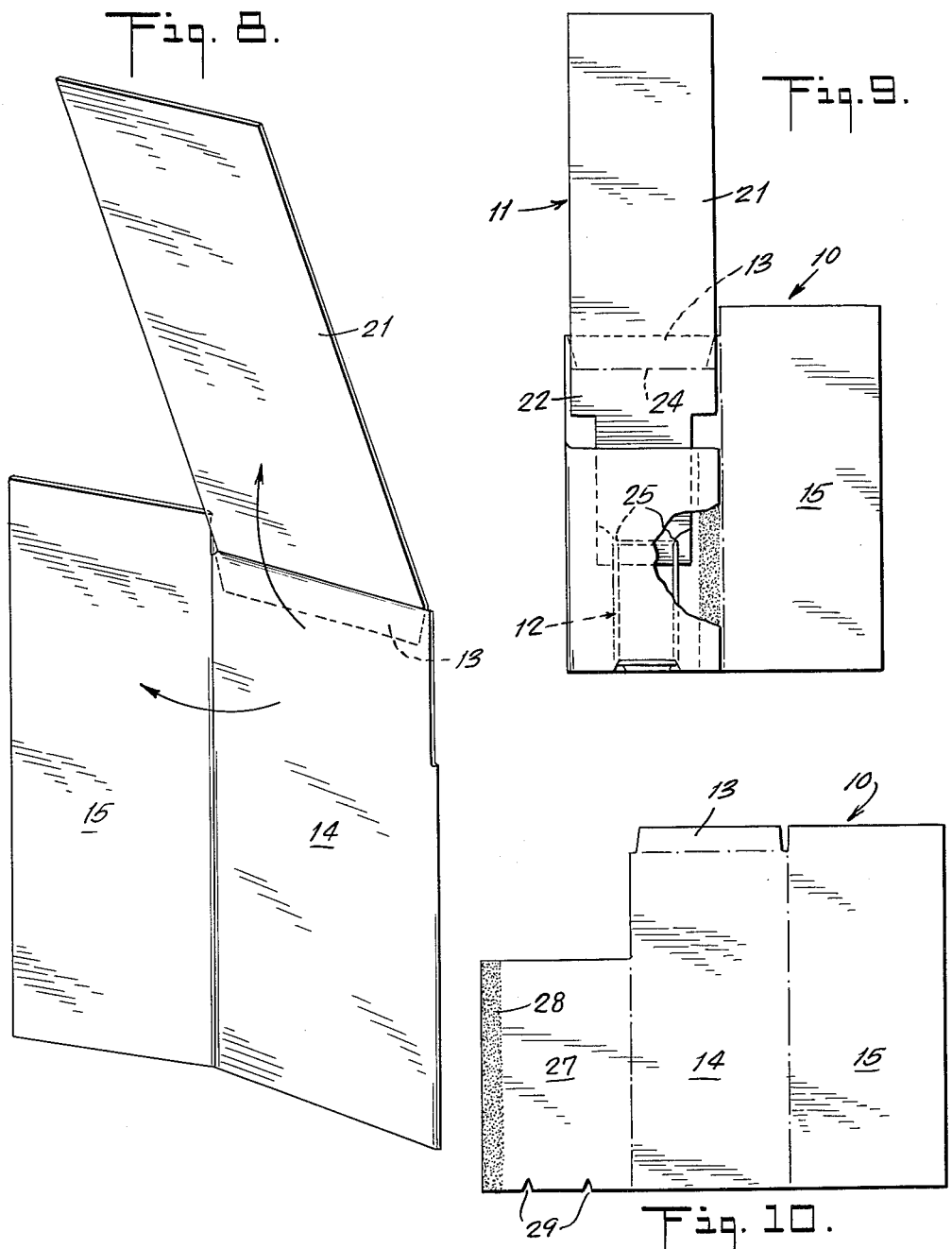

3,225,474
DISPLAY DEVICE
Lambert Dusseau, New York, N.Y., assignor to Package & Display Corp., Brooklyn, N.Y., a corporation of New York
Filed Aug. 8, 1963, Ser. No. 300,879
9 Claims. (Cl. 40—124.1)

The present invention relates to card, picture and sign exhibiting and, more particularly, to a foldable display device having a card adapted to be placed in an upright position when the device is unfolded.

Accordingly, an object of the present invention is to provide such a display device which is reliable in operation.

Another object is to provide such a display device which is durable in construction and can be used over and over again.

Another object is to provide such a display device which is constructed of a minimum number of parts which are readily assembled and secured.

A further object is to provide such a display device which is extremely simple and economical.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

FIG. 1 is a perspective view of the front of a display device in accordance with the present invention with the device shown in its folded condition.

FIG. 2 is a perspective view of the back of the device shown in FIG. 1.

FIG. 3 is a perspective view of the front of the device in unfolded condition.

FIG. 4 is an enlarged sectional view taken along the line 4—4 on FIG. 1.

FIG. 5 is an enlarged sectional view taken along the line 5—5 on FIG. 3.

FIG. 6 is an enlarged sectional view taken along the line 6—6 on FIG. 2.

FIG. 7 is a rear plan view of the parts of the display device prior to being folded together and secured.

FIG. 8 is a perspective view of the front of a simplified display device shown in unfolded condition.

FIG. 9 is a rear elevational view of the device shown in FIG. 8.

FIG. 10 is a rear plan view of a part of the device shown in FIGS. 8 and 9 prior to being folded together and assembled.

Referring now to FIGS. 1 to 7 of the drawings in detail, a display device is shown which generally comprises a body 10, a card 11, and a resilient element, such as a rubber band 12, for operating the card 11 in the manner to be described hereinafter.

As best shown in FIGS. 2, 3, and 7, the body 10 comprises a first or central panel 14 and second and third or right and left side panels 15 and 16, respectively, as viewed in FIG. 7, each foldably connected to a side of the central panel 14, as is clearly evident in FIGS. 3 and 7. A foldable tab or hinge 13 is provided at the upper portion of the central panel 14 for the purpose about to be described, and a flap 17 is foldably connected at 18 to the lower edge of the central panel 14. The flap 17 has a notch or recess 19 at each side of the fold 18 for reception of the rubber band 12, and has foldable tabs 20 at its sides adapted to be folded inwardly and secured to the back of the central panel 14 adjacent its side edges (FIG. 2) to provide a guide or pocket (FIGS. 4 and 5) for slidably housing the card 11.

The card 11 comprises upper and lower sections 21 and 22 connected by a fold 24. The lower portion of the upper card section 21 is secured to the tab 13 (FIG. 5), whereby the upper card section is foldably hinged to the panel 14. The lower card section 22 is slidably mounted in the pocket provided by the flap 17 and has a notch or recess 25 at each side edge for reception of the rubber band 12. A rubber band of proper size and length is strung through the notches 19 and 25, and is effective to pull the lower card section 22 downwardly when the display device is unfolded, so that the fold 24 is below the upper edge of the central panel 14 and the upper card section 21 extends above the upper edge of the panel 14 (FIGS. 3 and 5).

When the display device is folded together (FIGS. 1, 2, 4 and 6), the upper card section 21 is folded downwardly across the central panel 14 to place the fold 24 above the upper edge of the central panel 14, whereby the lower card section 22 is moved upwardly to elongate the rubber band 12 and tension the same, so that it is effective to pop up the upper section 21 of the card 11 when the device is again unfolded.

Referring now to FIGS. 8 to 10 of the drawings in detail, a display device is shown which is similar to the device just described but is somewhat simplified. This device generally comprises a body 10, a card 11, and a rubber band 12 or the like.

The body 10 comprises a first panel 14, and a second panel 15 foldably connected at one side edge to the panel 14. A foldable tab 13 is provided at the upper portion of the panel 14, and a flap 27 is foldably connected to the other side edge of the panel 14. The flap 27 has a tab 28 at its free side edge which is adapted to be secured, as by glue, to the back of the panel 14 adjacent its edge where the panel 15 is foldably connected to provide a pocket for slidably housing the card 11. The lower edge of the flap 27 is formed with a pair of notches 29 for reception of the rubber band 12.

The card 11 comprises upper and lower sections 21 and 22, respectively, connected by a fold 24. The lower portion of the upper card section 21 is secured to the tab 13 (FIG. 9), whereby the upper card section is foldably connected to the panel 14 adjacent its upper edge. The lower card section 22 is slidably mounted in the pocket provided by the flap 27 and has a notch 25 at each side edge for reception of the rubber band 12.

When the rubber band 12 is strung through the notches 25 and 29, it is effective to pull the lower card section 22 downwardly upon unfolding the display device and is adapted to be tensioned upon folding together the device in the same manner as previously described with reference to the display device shown in FIGS. 1 to 7.

The essential differences between the two illustrative embodiments herein are that one or two foldable panels may be employed, and that the pocket construction and its assembly is more simple, as shown in FIGS. 9 and 10.

From the foregoing description, it will be seen that the present invention provides a novel and useful display device which can be made in practically any size. The display device has a fascinating pop-up action which is provided by simple, durable elements. The display device is constructed and assembled in an economical manner and consists of only three elements.

As various changes may be made in the form, construction, and arrangement of the parts herein, without sacrificing any of its advantages, it is to be understood that all matters are to be interpreted as illustrative and not in any limiting sense.

What is claimed is:

1. A display device comprising a first panel; a card in back of said panel having an upper section above the upper edge of said panel, a lower section below the upper edge of said panel and a fold interconnecting said upper and lower sections; resilient means attached to said lower card section and said panel to move said fold below the upper edge of said panel; hinge means at the top of said first panel secured to said upper section adjacent said fold for foldably connecting a lower portion of said upper card section to an upper portion of said panel, the upper card section being adapted to be folded downwardly across the front of said panel to place said fold above the upper edge of said panel and thereby tension said resilient means; and a second panel foldably connected to one side to a side of said first panel and being adapted to be folded across the front of said first panel and over said upper card section to retain the latter in its downwardly folded position, whereby upon folding said second panel away from said first panel, said upper card section is released and said resilient means is effective to place said upper card section in an upright position.

2. A display device according to claim 1, wherein said first panel has a guide at the back thereof for slidably housing said lower card section.

3. A display device according to claim 2, wherein said first panel has a flap foldably connected thereto and secured to the back thereof to provide a pocket which constitutes said guide.

4. A display device according to claim 1, wherein said first panel has notch means adjacent its lower edge, said lower card section has notch means, and said resilient means is a rubber band strung through said notch means.

5. A display device according to claim 4, wherein said notch means on said first panel are provided by a flap foldably connected to the lower edge of said first panel and folded against the back thereof.

6. A display device according to claim 5, wherein said flap has its sides secured to the back of said first panel and provides a pocket for slidably mounting said lower card section.

7. A display device according to claim 1, wherein a third panel is foldably connected at one side to the other side of said first panel and functions like said second panel.

8. A display device according to claim 1, wherein said first panel has a flap foldably connected at one side thereof which flap is folded across the back of said first panel and has its free edge secured to the back of said first panel to provide a pocket for slidably mounting said lower card section.

9. A display device according to claim 8, wherein said flap has a pair of notches at the lower edge thereof, said lower card section is formed with a notch at each side edge thereof, and said resilient means is a rubber band strung through said notches.

References Cited by the Examiner

UNITED STATES PATENTS 3,035,363   5/1962   Luchsinger _____ 40—124.1
3,091,877   6/1963   Luchsinger _____ 40—124.1

EUGENE R. CAPOZIO, *Primary Examiner.*

JEROME SCHNALL, *Examiner.*